Figure 1:
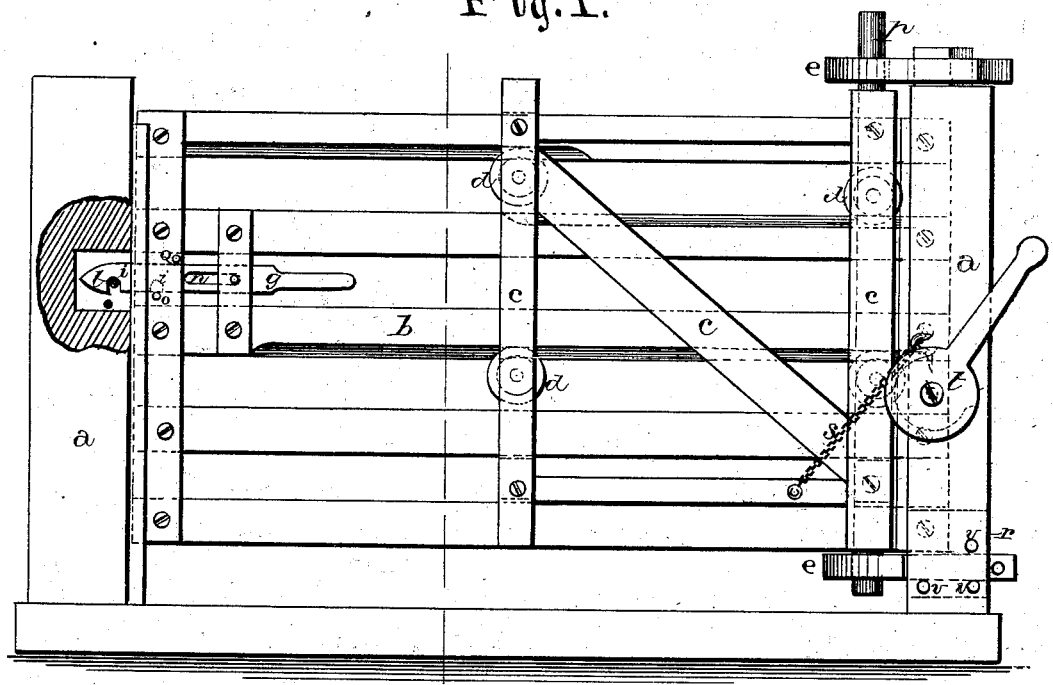
Figure 2:
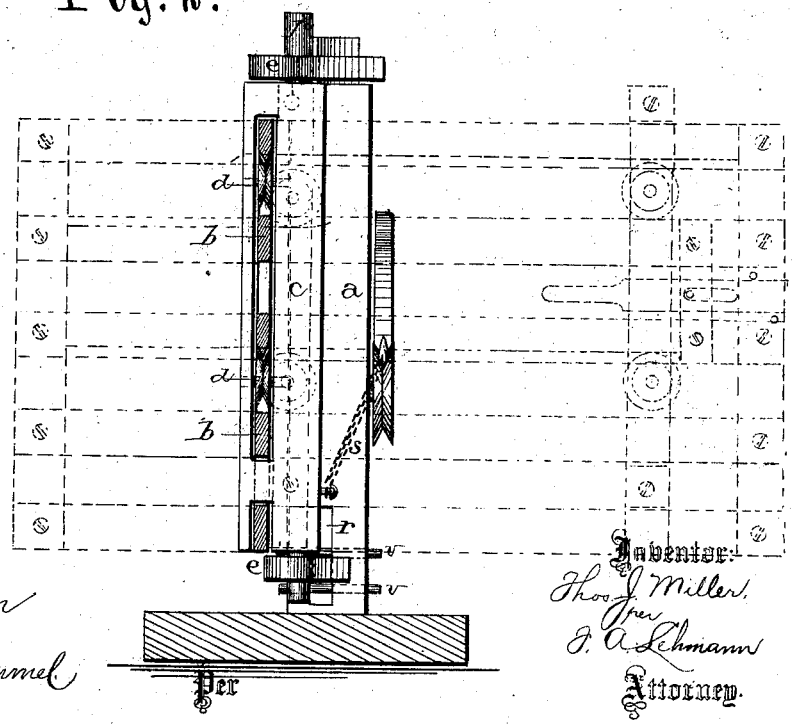

T. J. MILLER.
Gate.

No. 203,479.  Patented May 7, 1878.

Witnesses:
J. W. Garner
Jas. F. DuHamel

Inventor:
Thos. J. Miller,
per J. A. Lehmann
Attorney.

UNITED STATES PATENT OFFICE.

THOMAS J. MILLER, OF SCOTLAND COUNTY, MISSOURI.

IMPROVEMENT IN GATES.

Specification forming part of Letters Patent No. 203,479, dated May 7, 1878; application filed March 28, 1878.

*To all whom it may concern:*

Be it known that I, THOMAS J. MILLER, of the county of Scotland and State of Missouri, have invented certain new and useful Improvements in Farm-Gates; and I do hereby declare the following to be a full, clear, and exact description of the invention, such as will enable others skilled in the art to which it pertains to make and use it, reference being had to the accompanying drawings, which form part of this specification.

My invention relates to an improvement in farm-gates; and it consists in making the lower bearing of the gate vertically adjustable in the post upon which the gate is pivoted, so that the gate can be raised upward to pass over snow-drifts, to let small animals pass under it, and to compensate for any sagging that may take place in the gate, the said adjustable bearing being operated by a cam-lever and chain, which not only serves to raise the gate upward, but also to swing the gate open after it has been unlatched, as will be more fully described hereinafter.

The accompanying drawings represent my invention.

$a$ represents the two gate-posts; $b$, the gate, of any desired construction; $c$, the pivoted frame, provided with the rollers $d$, upon which the gate slides back and forth; and $e$, the bearings secured to one of the posts, and in which the frame $c$ is pivoted, as shown.

The latch $g$ of the gate is made slotted, as shown, and has two notches, $i$, made in its under side, one of which notches catches over a pin, $o$, which is passed through the front edge of the gate, and which serves to lock the latch in position after the gate has been closed. The other notch catches in a hole or recess formed in the post $a$, against which the gate closes, or over a pin, $l$, which is passed through the edge of the post for the latch to catch over when the gate is in an elevated position. By thus having two notches, $i$, and a slot, $n$, in the latch, the latch cannot be drawn backward in order to open the gate until after its rear end has been forced downward, so as to raise the notch $i$ above the pin $o$. By this construction of parts the gate is prevented from being so easily unlatched, and enables it to be locked in position by passing a pin, $q$, through the edge of the gate, just above its top, after it has been once latched.

After the gate has been unlatched it may either be moved backward upon the frame $c$ and rollers $d$ to any desired extent, and then drawn around so as to stand at right angles to the two posts $a$, or it may be opened without moving it backward upon the rollers.

The pivoted frame $c$ is provided with a long journal or bearing, $p$, at its upper end, but with only a short one at its bottom. Cut through the post $a$ is a mortise, $r$, of any desired length, in which the lower bearing $e$ moves vertically. This bearing is secured to a short journal at the bottom of the frame $c$, so that when the frame $c$ is adjusted vertically this bearing $e$ will move with it. Attached to the frame $c$ is a chain, $s$, which has its upper end fastened to the cam-lever $t$, which is pivoted to the side post $a$. By drawing down upon the handle of this cam the frame $c$ is raised vertically, carrying the lower bearing $e$ with it, and, after the bearing has been raised to a suitable height, pins $u$ may be passed through the post, so as to hold the bearing at any desired point. By means of this cam-lever and chain, and movable bearing for the frame $c$, the frame, carrying the gate with it, may be raised vertically to any desired height above the ground, so as to cause it to swing over snow-drifts or other obstructions, to allow small animals to pass from one field to another, and to compensate for any sagging that may take place in the gate. Not only are pins passed through the post for the purpose of holding the bearings $c$ in any desired position, but pins may be passed into the post $a$ for the purpose of catching the handle of the cam-lever, and thus preventing it from moving backward. Where the pins are not placed in front of the lever after the gate has been unlatched, this cam-lever can be used to swing the gate wide open, as well as to adjust the gate vertically.

Having thus described my invention, I claim—

1. A latch, $g$, provided with a slot, and having the two notches $i$ made in its lower edge, in combination with a pin, $o$, and pin $q$, passed through the gate to lock it in position after it has caught upon the post or pin $l$, substantially as shown.

2. The post $a$, having a mortise cut through it for the movable bearing $e$ to move vertically, in combination with the pins for supporting the bearing in position, and the cam-lever and chain for raising the bearing and pivoted frame $c$ vertically upward, substantially as shown.

In testimony that I claim the foregoing I have hereunto set my hand this 16th day of March, 1878.

THOMAS J. MILLER.

Witnesses:
 M. Q. CRETCHE,
 I. P. DAVIS.